United States Patent [19]

Roschger et al.

[11] Patent Number: 5,525,152
[45] Date of Patent: Jun. 11, 1996

[54] PIGMENT SALTS AND THEIR USE FOR DYEING AND PIGMENTING

[75] Inventors: Peter Roschger, Köln, Germany; Stephan Michaelis, Leverkusen; Günther Franke, Mount Pleasant, S.C.; Bernd Woost, Rösrath; Bernd Kaletta, Langenfeld, both of Germany

[73] Assignee: Bayer Aktiengesellschaft, Leverkusen, Germany

[21] Appl. No.: 431,609

[22] Filed: May 1, 1995

[30]   Foreign Application Priority Data

May 4, 1994 [DE] Germany .......................... 44 15 656.1

[51] Int. Cl.$^6$ .................................................. C08K 5/3462
[52] U.S. Cl. ........................ 106/498; 106/499; 106/500; 106/501; 106/502; 106/505; 106/506; 106/493
[58] Field of Search ................................. 106/498, 499, 106/500, 501, 502, 505, 506, 493

[56]          References Cited

U.S. PATENT DOCUMENTS 3,843,653  10/1974  Aldridge ................................. 544/342

FOREIGN PATENT DOCUMENTS 599490   3/1948   United Kingdom .
1294322  10/1972  United Kingdom .

OTHER PUBLICATIONS

Chemical Abstracts, vol. 119, No. 2, Jul. 12, 1983, Abstract No. 10444n, Schmidt et al 'metal complexes of dyes' p. 93, & Z. Naturforsch, B: Chem. Sci., vol. 48, No. 2, 1993, pp. 189–194.
J. Med. Chem., 9, 610–612 (Month unavailable) 1966.
J. Biol. Chem., 71, 497–499 (Month unavailable) 1927.
J. Am. Chem. Soc., 77, 2243–2248, Apr. 20, 1955.

*Primary Examiner*—Mark L. Bell
*Assistant Examiner*—Scott L. Hertzog
*Attorney, Agent, or Firm*—Joseph C. Gil; Richard E. L. Henderson

[57]          ABSTRACT

The present invention relates to a process for coloring polymeric materials by dyeing or pigmenting said polymeric materials with a pigment salt having the formula (I):

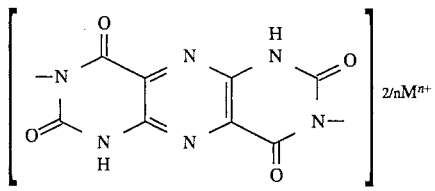

and tautomeric forms thereof, wherein $M^{n+}$ is an n-valent cation.

10 Claims, No Drawings

PIGMENT SALTS AND THEIR USE FOR DYEING AND PIGMENTING

BACKGROUND OF THE INVENTION

The invention relates to an improved process for dyeing and pigmenting of coating materials and plastics with pigment salts and to novel pigment salts.

The use of organic pigments for coloring plastics and in coating materials is already known. The object of the present invention was to provide application methods and pigments having improved performance and synthetic properties.

SUMMARY OF THE INVENTION

The present invention relates to a process for coloring polymeric materials (preferably coating materials or plastics) comprising dyeing or pigmenting said polymeric materials with a pigment salt having the following formula (I):

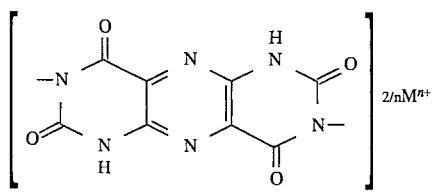

and the tautomeric forms thereof, wherein $M^{n+}$ is one or more n-valent cations. Although one tautomeric form is represented above for formula (I), the other tautomeric forms are, of course, also included within the scope of the invention.

Suitable cations for such salts are the metal cations that are conventional for pigments, although it is also possible for part of the charge of the anion to be compensated by hydrogen ions ($H^+$). In a preferred embodiment, the cations $M^{n+}$ are those of metal atoms (i.e., $Z^{n+}$) and hydrogen atoms (i.e., $H^+$), especially mixtures of $2m/n\ Z^{n+}$ ions together with $2(1-m)\ H^+$ ions, wherein Z denotes one or more n-valent metal atoms, n is an integer from 1 to 3, and m is from 0.7 to 1.0.

In preferred embodiments, $Z^{n+}$ denotes an alkali metal cation (where n is 1) such as $Li^+$, $Na^+$, $K^+$, $Cs^+$, and $Rb^+$; an alkaline earth metal cation (where n is 2) such as $Mg^{2+}$, $Ca^{2+}$, $Sr^{2+}$, and $Ba^{2+}$; and the cations $Al^{3+}$, $Pb^{2+}$, $Sn^{2+}$, $Zn^{2+}$, $Ni^{2+}$, $Co^{2+}$, $Co^{3+}$, $Mn^{2+}$, $Mn^{3+}$, $Fe^{2+}$, $Fe^{3+}$, $Cr^{3+}$, $Ti^{3+}$, $Cu^+$, $Cu^{2+}$, and $Cd^{2+}$. It is, of course, also possible to use mixtures of such metal ions.

In particularly preferred embodiments, $Z^{n+}$ represents $Cu^+$, $Na^+$, $K^+$, $Mg^{2+}$, $Ca^{2+}$, $Sr^{2+}$, $Al^{3+}$, and $Mn^{2+}$ or mixtures thereof.

DETAILED DESCRIPTION OF THE INVENTION

The preparation of the potassium salt of a compound having an anion moiety of formula (I) (that is, where $Z^{n+}$ is $K^+$) is described in *J. Med. Chem.*, 9, 610–612 (1966). Potassium salts, silver salts, and sodium salts are mentioned in *J. Biol. Chem.*, 71, 497–499 (1927). Salts with other cations and their use as colorants are not described in these references.

The invention, therefore, also relates to novel pigment salts having an anion moiety of the formula (I) in which Z is as defined above, with the exception that $Z^{n+}$ does not include $K^+$, $Ag^+$, or $Na^+$.

The salts of the invention can be prepared from the free substance of the formula (I) with $M^{n+}$ is $H^+$ by reacting solutions of this substance in appropriate solvents, preferably water, with salts of the metals Z and isolating the precipitate.

Examples of appropriate salts of the metals Z are those with the fluoride, chloride, bromide, iodide, sulfate, nitrate, acetate, phosphate, oxide, hydroxide, carbonate, and hydrogen carbonate anions Another possible method for preparing salts of the formula (I) involves salt exchange, which comprises adding an excess of a metal salt having a different cation from that in the salt of the formula (I) to solutions of a particular salt of the formula (I) in, for example, hot water, thereby bringing about exchange of the cation in salts of the formula (I).

A further preparative method involves the addition of desired metal ions ($Z^{n+}$) during synthesis of the basic anion structure of the pigment salts of the formula (I). This basic structure can be synthesized, for example, as described in *J. Med. Chem.*, 9, 610–612 (1966) or *J. Biol. Chem.*, 71, 497 (1927), by oxidative dimerization of 5-aminouracil in accordance with the following scheme:

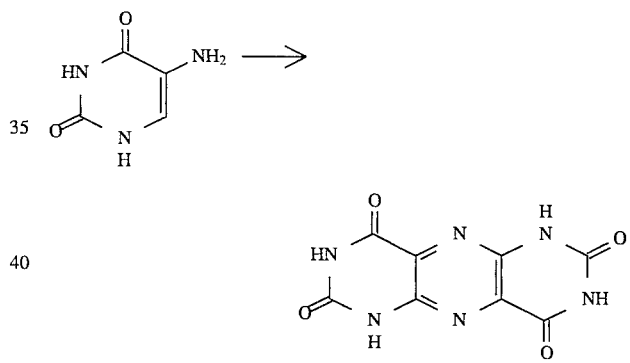

In the cited literature references, the oxidizing agent used is potassium hexacyanoferrate(III). Other suitable oxidizing agents are, for example, air, oxygen, hydrogen peroxide, hypochlorite, persulfates, percarbonates, peracetic add, performic acid, and the like, with the addition of catalysts also being possible.

A further preparation method is described in *J. Am. Chem. Soc.*, 77, 2243–2248 (1955).

However, the basic structure can also be prepared dimerizing 6-azidouracil, 6-hydroxylaminouracil, 5,6-diaminouracil, 6-amino- 5-nitrosouracil, 5-nitro-, 5-nitroso-, or 5-aminobarbituric acid or by deaminating (e.g., with nitrous acid) 2,4,6,8-tetraamino-1,3,5,7,9,10-hexaazaanthracene.

Other possibilities for the synthesis are the condensation reactions carried out in accordance with the following scheme:

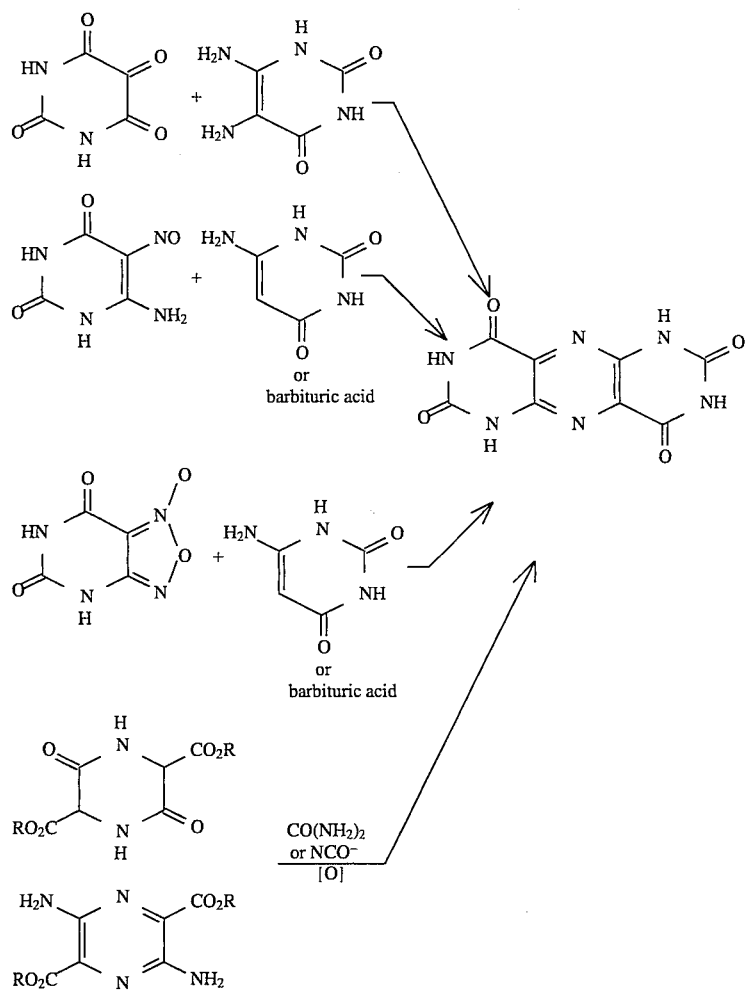

The compounds of the formula (I) are obtained in a form that is already suitable for pigment use or can be converted into the appropriate form by known aftertreatment processes. The compounds of formula (I) can be finely divided by milling with or without milling auxiliaries such as inorganic salts or sand, optionally in the presence of solvents such as toluene, xylene, dichlorobenzene, or N-methylpyrrolidone. The color strength and transparency of the pigment can he influenced by varying the aftertreatment.

Compounds of formula (I) can be used in particular as pigments for various known polymeric materials, especially as high molecular weight organic materials. Examples of high molecular weight organic materials that can be colored or pigmented with compounds of the formula (I) include cellulose ethers and cellulose esters, such as ethyl cellulose, nitrocellulose, cellulose acetate, and cellulose butyrate, naturally occurring resins or synthetic resins, such as polymer resins or condensation resins, for example, amino resins, especially urea/formaldehyde and melamine/formaldehyde resins, alkyd resins, phenolic resins, polycarbonates, polyolefins, polyvinyl chloride, polyethylene, polypropylene, polyvinyl propionate, polyamides, superpolyamides, polyvinyl acetate, polymers and copolymers of acrylic esters, methacrylic esters, acrylonitrile, acrylamide, butadiene, styrene, polyurethanes or polyester, rubber, casein, and silicon and silicone resins, either individually or in mixtures with other organic or inorganic dyes and pigments, for example, inorganic white pigments such as titanium dioxide (rutile).

It is generally not critical whether the high molecular weight organic compounds mentioned above are present as plastic masses or melts or as spinning solutions, in preparations such as flush pastes with organic liquids, in coating compositions such as physically or oxidatively drying coating materials, stoving enamels, reactive coatings, in two-pack coating, materials, emulsion paints for weather-resistant coatings and size colors, or in printing inks for printing such as paper, textiles, and sheet metal.

Depending on the intended use, it may prove advantageous to use the pigments according to the invention as toners or in the form of preparations. The compounds of the formula (I) are preferably used in a quantity of from about 0.1 to about 10% by weight, based on the high molecular weight organic materials to be pigmented.

The colorations that are obtained, for example, in plastics, fibers, coatings materials, or prints, are distinguished by color strength, by good dispersability, by good fastness to overcoating, migration, heat, light, and weather, and by a good gloss.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all pads and percentages are parts by weight and percentages by weight, respectively.

EXAMPLES

Example 1

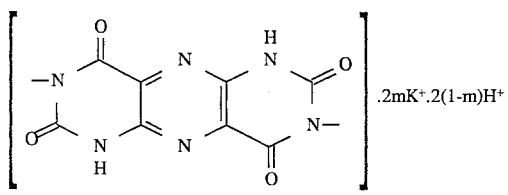

The potassium salt having the above formula was prepared according to the method of *J. Med. Chem.*, 9, 611 (1966). The potassium content was 19.0–20.1% (corresponding to a value for m of 0.75–0.81). The dry pigment was milled and used for coloring as described in the following examples.

Example 2

Transparent Coloring in Plasticized Polyvinyl Chloride (PVC-P)

0.1 part of the pigment from Example 1 was mixed with 100 parts of PVC compound in a slow-running laboratory mixer, placed onto a rotating laboratory roller-type mixing apparatus, homogenized, and drawn off as a sheet.

The transparent orange colorations that were obtained exhibited excellent light fastness, weather fastness, and migration fastness.

Example 3

Opaque Coloring in PVC-P 0.2 part of the pigment from Example 1, together with 10 parts of titanium dioxide (rutile type), were mixed with 100 pads of PVC compound and the mixture was homogenized at 160° C. The sheet drawn off from the laboratory roller-type mixer had an opaque orange color. The colorations showed very good migration fastness, light fastness, and weather fastness.

Example 4

Translucent and Opaque Coloring in High-Density Polyethylene (HD-PE) and Polypropylene 100 parts of commercial polyethylene granules were mixed with 0.2 part of the pigment from Example 1 in a slow-running mixing drum. The resultant granules were homogenized at 170° C. on an extruder and were drawn off to give fiat strips, the resultant strips were granulated, and the resultant granules were molded on a screw injection molding machine at temperatures above 200° C. When the molding temperature was raised from 200° C. to 320° C., no change in color was observed.

The same results were obtained in opaque colorings with titanium dioxide (rutile type) in HD-polyethylene and in crystalline polypropylene, both as transparent pigmentations and as opaque pigmentations.

Example 5

Coloring of Polystyrene (PS) and Butadiene-Modified Polystyrene (SB)

0.1 part of the pigment from Example 1 was mixed with 0.5 part of titanium dioxide (ruffle type) and 100 pads of PS granules (or SB granules) and molded on a screw injection molding machine with increased backpressure. The resulting moldings exhibited an orange color and uniform pigment distribution.

Example 6

Coloring of ABS 0.5 part of the pigment from Example I was mixed with 4 parts of titanium dioxide (rutile type) and 100 pads of ABS powder, the mixture was plastified in an internal mixer at 180° C., homogenized, discharged through a roller apparatus, and granulated by conventional methods, and the resultant granules were molded on a screw injection molding machine to give moldings having an orange color. At processing temperatures from 220° C. to 280° C. and long residence times, no changes in color was observed.

Equally good results were obtained in polymer blends of ABS/polycarbonate composition.

Example 7

Coloring of Polycarbonate (PC) and Polycarbonate/Polybutylene Terephthalate (PC/PBT)

0.2 part of the pigment from Example 1 was mixed dry with a commercial polycarbonate, the mixture was melted at 290° C. in a twin-screw extruder, and the pigment was dispersed. The homogeneously colored PC was regranulated and the resultant regranulate was processed by conventional injection molding methods at temperatures of up to 340° C. No changes in color of the orange moldings were observed at different temperatures.

Likewise in PC/PBT, the pigment was heat resistant without changing color at processing temperatures from 250° C. to 290° C.

Example 8

4 g of finely milled pigment prepared as in Example 1 were dispersed in 92 g of a stoving enamel having the following composition:

33% alkyd resin
15% melamine resin
5% glycol monomethyl ether
34% xylene
13% butanol Suitable alkyd resins are products based on synthetic and vegetable fatty acids such as coconut oil, castor oil, ricinene oil, linseed oil, and the like. Urea resins can be used instead of melamine resins.

After dispersion had taken place, the pigmented enamel was applied to sheets of paper, glass, or plastic or to metal foils and then stored at 130° C. for 30 minutes. The coatings exhibited very good resistance to light and weathering, as well as good fastness to overcoating.

This stoving enamel was painted onto white paper and stoved at 130° C., thereby producing an orange color having an excellent level of fastness. Good results were likewise obtained with aqueous coating systems.

EXAMPLE 9

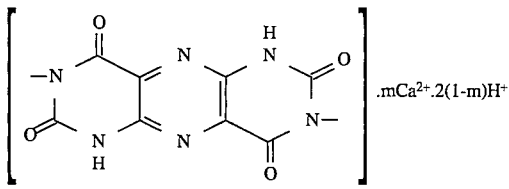

To a suspension of 1.24 g of the pigment from Example 1 (potassium salt) in 100 ml of hot water was added a solution of 1.2 g of calcium nitrate tetrahydrate in a little water. The mixture was rendered alkaline with KOH (30% strength solution in water) at about 80° C. and the resultant calcium salt was filtered off with suction, washed with water and methanol, and dried to yield 1.1 g of product. The calcium content was 10.9% (corresponding to a value for m of 0.76) and the potassium content was only 0.06%.

When used for coloring in analogy to Examples 2 to 8, red colorations with high fastness properties were obtained in plastics and coating materials.

What is claimed is:

1. A process for coloring a polymeric material comprising mixing said polymeric material with a pigment salt having the formula:

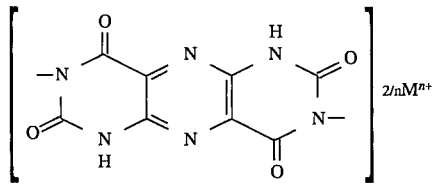

and the tautomeric forms thereof, wherein $M^{n+}$ represents one or more n-valent cations.

2. A process according to claim 1 wherein $M^{n+}$ consists essentially of an n-valent metal ion.

3. A process according to claim 2 wherein n is an integer of from 1 to 3.

4. A process according to claim 1 wherein cation $M^{n+}$ is $Cu^+$, $Na^+$, $K^+$, $Mg^{2+}$, $Ca^{2+}$, $Sr^{2+}$, $Al^{3+}$, $Mn^{2+}$, or a mixture thereof.

5. A process according to claim 1 wherein cation $M^{n+}$ comprises a mixture of $2m/n$ $Z^{n+}$ ions and $2(1-m)$ $H^+$ ions, wherein Z denotes one or more n-valent metal atoms, n is an integer from 1 to 3, and m is from 0.7 to 1.0.

6. A process according to claim 5 wherein cation $Z^{n+}$ is $Cu^+$, $Na^+$, $K^+$, $Mg^{2+}$, $Ca^{2+}$, $Sr^{2+}$, $Al^{3+}$, $Mn^{2+}$, or a mixture thereof.

7. A process according to claim 1 wherein the polymeric material is a coating material or plastic.

8. A pigment salt having the formula:

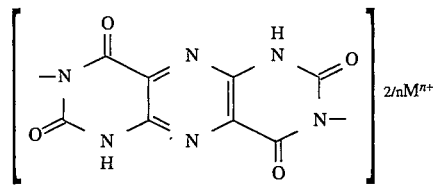

and the tautomeric forms thereof, wherein $M^{n+}$ represents one or more n-valent cations other than $K^+$, $Ag^+$, or $Na^+$.

9. A pigment salt according to claim 8 wherein cation $M^{n+}$ comprises a mixture of $2m/n$ $Z^{n+}$ ions and $2(1-m)$ $H^+$ ions, wherein Z denotes one or more n-valent metal atoms other than K, Ag, or Na, n is an integer from 1 to 3, and m is from 0.7 to 1.0.

10. A pigment salt according to claim 8 wherein cation $M^{n+}$ comprises a mixture of $2m/n$ $Z^{n+}$ ions and $2(1-m)$ $H^+$ ions, wherein $Z^{n+}$ denotes one or more members selected from $Cu^+$, $Mg^{2+}$, $Ca^{2+}$, $Sr^{2+}$, $Al^{3+}$, and $Mn^{2+}$ and m is from 0.7 to 1.0.

* * * * *